United States Patent
Oba

(10) Patent No.: US 7,911,729 B2
(45) Date of Patent: Mar. 22, 2011

(54) INFORMATION STORAGE APPARATUS

(75) Inventor: Kazuhide Oba, Higashine (JP)

(73) Assignee: Toshiba Storage Device Corporation, Tokyo (JP)

( * ) Notice: Subject to any disclaimer, the term of this patent is extended or adjusted under 35 U.S.C. 154(b) by 137 days.

(21) Appl. No.: 12/474,940

(22) Filed: May 29, 2009

(65) Prior Publication Data
US 2010/0007982 A1   Jan. 14, 2010

(30) Foreign Application Priority Data

Jul. 14, 2008 (JP) ................. 2008-182958

(51) Int. Cl.
*G11B 21/02* (2006.01)
(52) U.S. Cl. ........................................ 360/75
(58) Field of Classification Search .......... 360/75, 360/69, 55, 60; 369/59.1; 318/114
See application file for complete search history.

(56) References Cited

U.S. PATENT DOCUMENTS

| | | | | |
|---|---|---|---|---|
| 2,998,707 A | * | 9/1961 | Frantti et al. | ................ 62/3.3 |
| 3,610,025 A | * | 10/1971 | Brunner | ................ 73/40.5 R |
| 6,651,019 B2 | * | 11/2003 | Mizuguchi et al. | ............. 702/94 |
| 6,765,746 B2 | * | 7/2004 | Kusumoto | ................ 360/75 |
| 7,005,810 B2 | * | 2/2006 | Ueda et al. | ................ 318/114 |
| 2006/0140095 A1 | * | 6/2006 | Kazami et al. | ............. 369/59.1 |

FOREIGN PATENT DOCUMENTS

| | | |
|---|---|---|
| JP | B2 8-28067 | 3/1996 |
| JP | A 2007-122798 | 5/2007 |

* cited by examiner

*Primary Examiner* — Fred Tzeng
(74) *Attorney, Agent, or Firm* — Greer, Burns & Crain, Ltd.

(57) ABSTRACT

An information storage apparatus includes a housing; a recording medium in which information is recorded, disposed in the housing; a head that records/reproduces information onto/from the recording medium by making contact with or approaching to a surface of the recording medium; a head holding member for holding the head, being rotatable about a predetermined axis and moving the head along the recording medium; a driving section that drives the head holding member to rotate about the axis; a rotation restricting member disposed in a position where the head holding member collides, and that restricts a rotation area of the head holding member; a temperature change detecting section that detects temperature change in the housing; and a drive controlling section that causes the driving section to drive the head holding member to collide with the rotation restricting member, when a detection result by the temperature change detecting section indicates temperature change.

5 Claims, 6 Drawing Sheets

INFORMATION STORAGE APPARATUS

CROSS-REFERENCE TO RELATED APPLICATION

This application is based upon and claims the benefit of priority of the prior Japanese Patent Application No. 2008-182958, filed on Jul. 14, 2008, the entire contents of which are incorporated herein by reference.

FIELD

The embodiment discussed herein is related to an information storage apparatus that reproduces information and stores information in a way that a head held by a head holding member rotatable about a certain axis is brought into contact with or closer to a surface of a recording medium on which the information is to be recorded or is recorded.

BACKGROUND

In recent years, with the development of computer techniques, development of techniques related to equipment included in computers and peripheral equipment externally connected to computers have been advancing rapidly. A known example of such developing techniques is an information storage apparatus that includes a flat storage medium such as a magnetic disc, and stores information by writing the information to the storage medium.

Some types of information storage apparatuses record information on a storage medium and reproduce information from the storage medium (such recording and reproduction are referred to as "access" collectively, below) by bringing a head having a recording element and a reproduction element in contact with or closer to a surface of the storage medium. A hard disk device (HDD) is a representative example of these information storage apparatuses, and another known example is a magneto-optical disk (MO) device.

In such an information storage apparatus accessing a storage medium by using a head, multiple tracks are generally provided on the storage medium. These tracks are arranged in the radial direction concentrically around the disc center of the storage medium. The information storage apparatus performs the recording or reproducing of information by using the head in contact with or close to a surface of one of the tracks, while the storage medium is rotating. In this recording/reproducing system, the head needs to be moved to the track to be accessed (access target track). In the information storage apparatus accessing the storage medium by using the head, the head holding member which holds the head is moved above the storage medium, whereby the head is moved to the access target track.

In the recent information storage apparatus field, increasingly high recording density is achieved in storage media, leading to a decreasing trend in the distance between adjacent tracks (i.e., track pitch). To achieve highly accurate access, it is important to keep the head above the access target track with high accuracy without displacing the head from the track.

In general, in an information storage apparatus, the temperature inside the apparatus considerably changes along with the operation of the apparatus. Consequently, members and elements included in the information storage apparatus are deformed due to temperature change (accumulation of stress) in some cases. In particular, in the case of members and elements made of different kinds of materials, a portion where different materials are bonded together is highly likely to be deformed due to temperature change because these materials have different thermal expansion coefficients. When the extent of material deformation exceeds a certain critical limit, the materials instantaneously change their shapes (deformation release) to more stable shapes. This change causes a shock to the inside of the information storage apparatus. When the head accessing the storage medium is subjected to this shock, the head is displaced from the access target track, causing a problem of reduction in access accuracy. This problem is particularly serious when the head is displaced from the recording target track to a different track in the middle of information recording. This is because, in such a case, the information is erroneously recorded on the different track, and the information originally recorded on the different track is consequently deleted.

Recently, control systems have been proposed to avoid this problem (see Japanese Laid-open Patent Publication No. 2007-122798, for example). In such systems, temperature increase trend is monitored, and when the temperature rises above a predetermined threshold level, information recording is restricted to avoid reduction in information recording accuracy attributable to deformation release.

In the control system disclosed in Japanese Laid-open Patent Publication No. 2007-122798, however, information recording is restricted every time the temperature rises above the predetermined threshold level. This leads to another problem of reduction in working efficiency in information recording. Hence, further improvement is needed to achieve excellent access operation while avoiding reduction in access efficiency and reduction in access accuracy attributable to deformation release during access.

SUMMARY

According to an aspect of the invention, an information storage apparatus includes:

a housing;

a recording medium that is disposed in the housing and allows information to be recorded therein;

a head that performs at least one of information reproduction and information recording on the recording medium while being in contact with or being close to a surface of the recording medium;

a head holding member that is disposed in the housing, holds the head, is rotatable about a predetermined axis, and moves the head along the recording medium by rotating about the axis;

a driving section that drives the head holding member to rotate about the axis;

a rotation restricting member that is disposed in a position where the head holding member collides with the rotation restricting member by rotating about the axis, and that restricts a rotation area of the head holding member;

a temperature change detecting section that detects temperature change in the housing; and a drive controlling section that causes the driving section to drive the head holding member to collide with the rotation restricting member, when a detection result by the temperature change detecting section indicates temperature change reaching a predetermined change range.

According to this basic mode, when the detection result indicates that temperature change in the housing is larger than the predetermined change range, the head holding member is caused to collide with the rotation restricting member, thereby encouraging release of deformation in the materials used in the information storage apparatus. Accordingly, deformation release in the materials is less likely to occur while the head is reproducing or recording information, and reduction in information reproduction accuracy and recording accuracy can be avoided. In addition, since only short time is needed for collision of the head holding member with the rotation restricting member, reduction in information reproduction operation efficiency and recording operation efficiency can also be avoided.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

A concrete embodiment of the information storage apparatus having the above-described basic mode will be described below with reference to the accompanying drawings.

Figure 1:
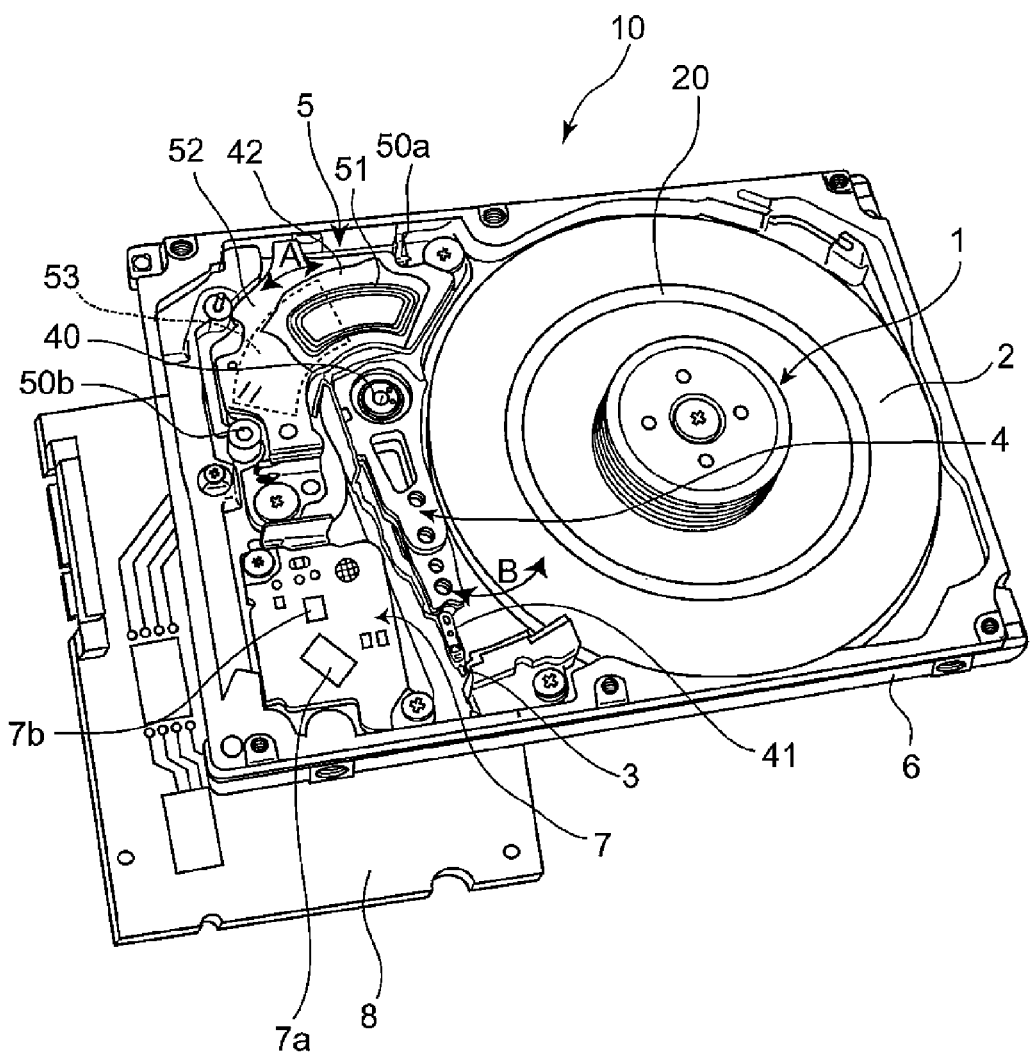
FIG. 1 illustrates a hard disk device (HDD) that is a concrete embodiment of an information storage apparatus.

FIG. 1 illustrates a hard disk device (HDD) 10, which is a concrete embodiment of the information storage apparatus.

The HDD 10 illustrated in FIG. 1 includes a voice coil motor 5 having a yoke 52. In FIG. 1, a cross section of the voice coil motor 5 in the yoke 52 is schematically illustrated. The voice coil motor 5 includes: a voice coil 51 with a lead winding therearound in a plane along the cross section; and two plate-shaped permanent magnets 53 (53a and 53b) facing each other in a direction perpendicular to the cross section with the voice coil 51 interposed therebetween. In FIG. 1, the position of the two plate-shaped permanent magnets 53 is indicated by a dotted line. By use of the permanent magnets 53a and 53b, a magnetic field of a predetermined size is applied to the voice coil 51.

The voice coil 51 is fixed to a coil supporter 42 that is to support the voice coil 51. Thereby, when a current flows through the voice coil 51, the voice coil 51 together with the coil supporter 42 moves in double arrow A directions illustrated in FIG. 1. The voice coil motor 5 also includes a first stopper 50a and a second stopper 50b both of which restrict a movable area for the voice coil 51. The first stopper 50a is a member that restricts move of the voice coil 51 in the right direction in FIG. 1, while the second stopper 50b is a member that restricts move of the voice coil 51 in the left direction in FIG. 1. Here, the first stopper 50a is coupled to the yoke 52.

The coil supporter 42 is a part of a carriage arm 4 that is rotatable about a shaft 40 serving as the rotation axis in the plane illustrated in FIG. 1. Move of the voice coil 51 generates driving force for rotating the carriage arm 4 about the shaft 40.

To one tip of the carriage arm 4, a suspension arm 41 is attached, and, to one tip of the suspension arm 41, a head 3 is attached. Along with rotation of the carriage arm 4 by receiving the driving force generated by the voice coil motor 5, the head 3 moves in double arrow B directions illustrated in FIG. 1.

The head 3 has the functions of reproducing information from a circular plate magnetic disc 2 and recording information on the magnetic disc 2 (such recording and reproducing are referred to as access collectively, below). Along with rotation of the carriage arm 4 about the shaft 40 by the voice coil motor 5, the head 3 moves in the double arrow B directions illustrated in FIG. 1. Here, the directions in which the head 3 moves correspond to the radial direction of the magnetic disc. Thus, the head 3 is positioned in a target head position (desired head position) in the radial direction of the magnetic disc prior to performing access.

Here, a combination of the suspension arm 41 and the carriage arm 4 is an example of the head holding member included in the basic mode; the voice coil motor 5 is an example of the driving section included in the basic mode; the first stopper 50a and the second stopper 50b are each an example of the rotation restricting member included in the basic mode.

The head 3 positioned in the desired position floats above a surface of the magnetic disc 2 by a infinitesimal distance, and the head 3 in this state reads information from the magnetic disc 2 and writes information to the magnetic disc 2. In the surface of the magnetic disc 2, multiple band-like tracks are arranged in the radial direction concentrically around the disc center. In FIG. 1, a single track 20 of the multiple tracks is illustrated. By receiving rotation force from a spindle motor 1, the magnetic disc 2 rotates about the spindle motor 1 in the plane in which the magnetic disc 2 extends.

In the track 20, magnetic spots each having a magnetization direction perpendicular to the magnetic disc 2 are aligned in an extending direction of the track 20. The magnetization direction, either upward or downward, represents binary information, either "0" or "1," representing 1-bit information. Along with rotation of the magnetic disc 2, the head 3 positioned near the surface of the magnetic disc 2 sequentially comes close to the magnetic spots aligned along the track 20.

The head 3 includes two elements: a recording element that writes information to the magnetic disc 2; and a reproduction element that reads information from the magnetic disc 2. The reproduction element includes a magneto-resistance effect film whose electrical resistivity changes in accordance with the directions of applied magnetic fields. To reproduce information, the reproduction element detects changes in value of current flowing through the magneto-resistance effect film based in accordance with the directions of magnetic fields generated by magnetization, and thereby reads information represented by the magnetization directions. A signal representing the current changes is a reproduction signal representing the read information, and is outputted to an inner substrate 7. The recording element includes a coil and magnetic poles functioning as an electro-magnet. To record data, an electric recording signal representing the data with bit values is inputted to the recording element in the head 3 positioned near the magnetic disc 2, through the inner substrate 7, and the recording element feeds current having directions corresponding respectively to the bit values of the recording signal through the coil. The magnetic fields generated in the coil by the current are sequentially applied to magnetization in the magnetic disc 2 through the magnetic poles, so that the magnetization directions are set respectively to the directions corresponding to the bit values of the recording signal. Thus, the data carried by the recording signal is recorded in the form of magnetization direction.

The inner substrate 7 has a function of processing a reproduction signal and a recording signal, and includes: a shock sensor 7a that detects shocks applied to the HDD 10; and a temperature sensor 7b that measures temperature. The shock sensor 7a is a so-called acceleration sensor. In this embodiment, vibrations occurring in the HDD 10 are also detected by using the shock sensor 7a.

The sections directly related to information storing/reproduction, such as the voice coil motor 5, the carriage arm 4, the head 3 and the inner substrate 7, are housed in a base 6 together with the magnetic disc 2. In FIG. 1, a state inside the base 6 is illustrated. The temperature sensor 7b measures the temperature inside the base 6, and the shock sensor 7a detects the state of vibrations passing the base 6. On a back side of the base 6, a control substrate 8 that controls drive of the voice coil motor 5 and access by the head 3 is disposed. Here, although omitted in FIG. 1, an outer member that covers the base 6 from a front side of the base 6 and that thereby keeps the inside of the base 6 in a hermetic state is also included in the HDD 10. Each of the sections provided in the base 6 is electrically connected to the control substrate 8 by means of an unillustrated mechanism, the recording signal inputted to the head 3 and the reproduction signal generated by the head 3 are transmitted through the inner substrate 7, and are then subjected to processing in the control substrate 8. In addition, detection results obtained in the shock sensor 7a and the temperature sensor 7b are also inputted to the control substrate 8 through the inner substrate 7. The control substrate 8 generates vibration data indicating time change of vibrations in the base 6, on the basis of the acceleration detected by the shock sensor 7a, and also monitors temperature change in the base 6 on the basis of the detection result obtained by the temperature sensor 7b.

Here, a combination of the base 6 and the outer member covering the base 6 is an example of the housing included in the basic mode; a combination of the temperature sensor 7b and the control substrate 8 is an example of temperature change detecting section included in the basic mode; the control substrate 8 is an example of the drive controlling section included in the basic mode.

In general, since the temperature inside a HDD considerably changes along with the operation of the information storage apparatus, the members and elements included in the HDD are deformed due to temperature change (stress accumulation) in some cases. In particular, in the case of members and elements made of different kinds of materials, a portion where different materials are bonded together is highly likely to be deformed due to temperature change because these materials have different thermal expansion coefficients. For example, many parts of a yoke are coupled to different members disposed around the yoke, such as permanent magnets, with screws and the like, and deformation attributable to temperature change is likely to occur at such coupled parts. When the extent of material deformation exceeds a certain critical limit, the materials instantaneously change their shapes (deformation release) to more stable shapes. This change causes a shock to components included in the HDD. When the head accessing the storage medium is subjected to this shock, the head is displaced from the access target track, causing a problem of reduction in access accuracy. This problem is particularly serious when the head is displaced from the recording target track to a different track in the middle of information recording. This is because, in such a case, the information is erroneously recorded on the different track, and the information originally recorded on the different track is consequently deleted.

To address this problem, in the HDD 10 according to this embodiment, access by the head 3 is suspended when a large temperature change is detected in the base 6. Then, the carriage arm 4 is caused to collide with the first stopper 50a, and a shock caused by the collision encourages deformation release. Next, states in which the rotation area of the carriage arm 4 is restricted by the first stopper 50a and the second stopper 50b are described.

Figure 2A:
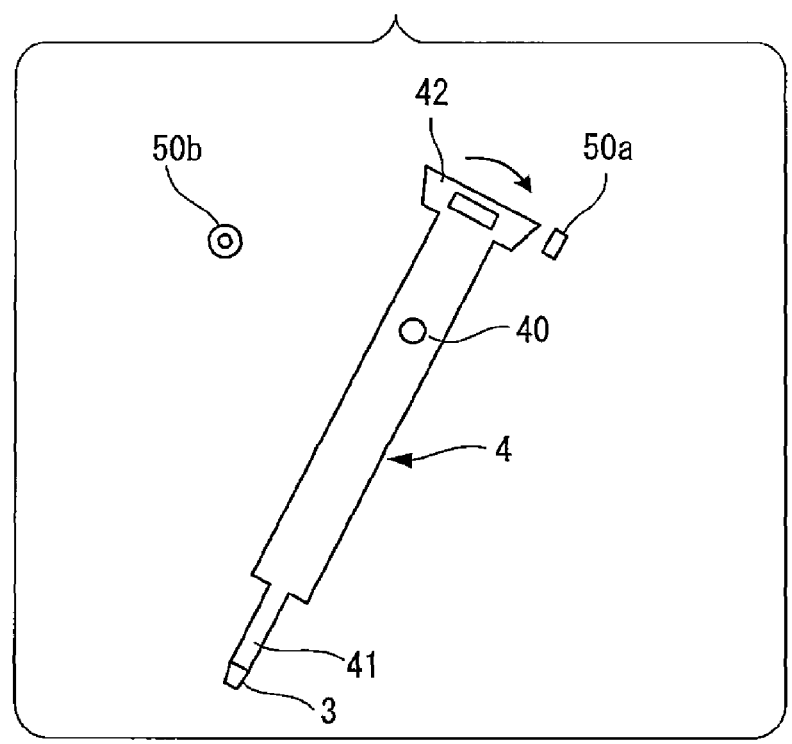
FIGS. 2A, 2B are schematic views illustrating states in which a carriage arm rotates and collides with a first stopper and a second stopper.
Figure 2B:
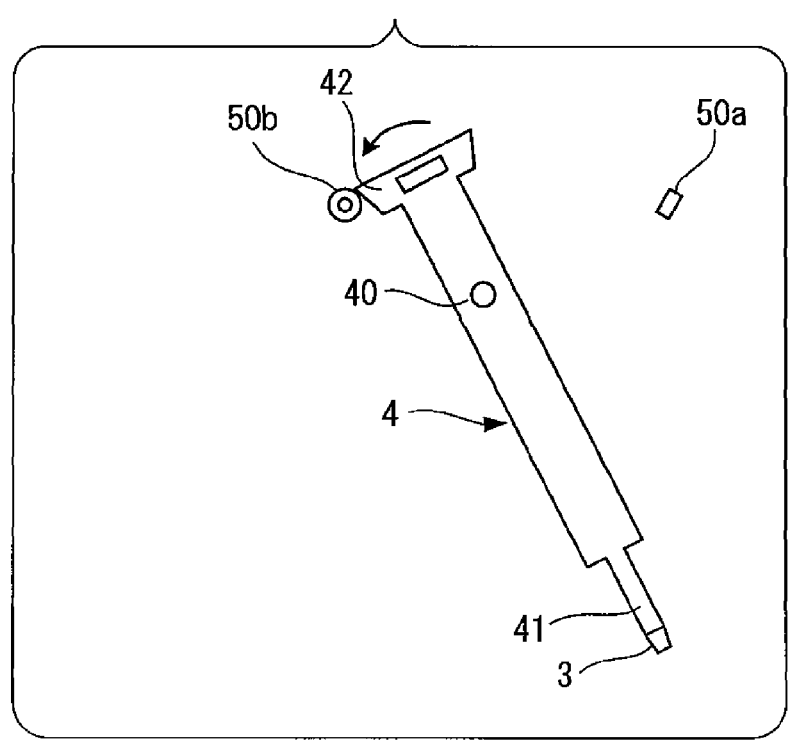

FIGS. 2A, 2B are schematic views illustrating states in which the carriage arm 4 rotates and collides with a first stopper 50a and a second stopper 50b.

FIG. 2A illustrates a state in which the coil supporter 42, which is a part of the carriage arm 4, moves in the right direction in FIG. 2A and then collides with the first stopper 50a. FIG. 2B illustrates a state in which the coil supporter 42 moves in the left direction in FIG. 2B and then collides with the second stopper 50b. The coil supporter 42 is thus restricted to move in the area between the first stopper 50a and the second stopper 50b.

In the HDD 10 according to this embodiment, when a large temperature change is detected in the base 6, the control substrate 8 in FIG. 1 controls the voice coil motor 5 to cause the coil supporter 42 of the carriage arm 4 to collide with the first stopper 50a as illustrated in FIG. 2A, to encourage deformation release.

Next, drive control for the carriage arm 4 in accordance with temperature change performed in the HDD 10 according to this embodiment is described.

Figure 3:
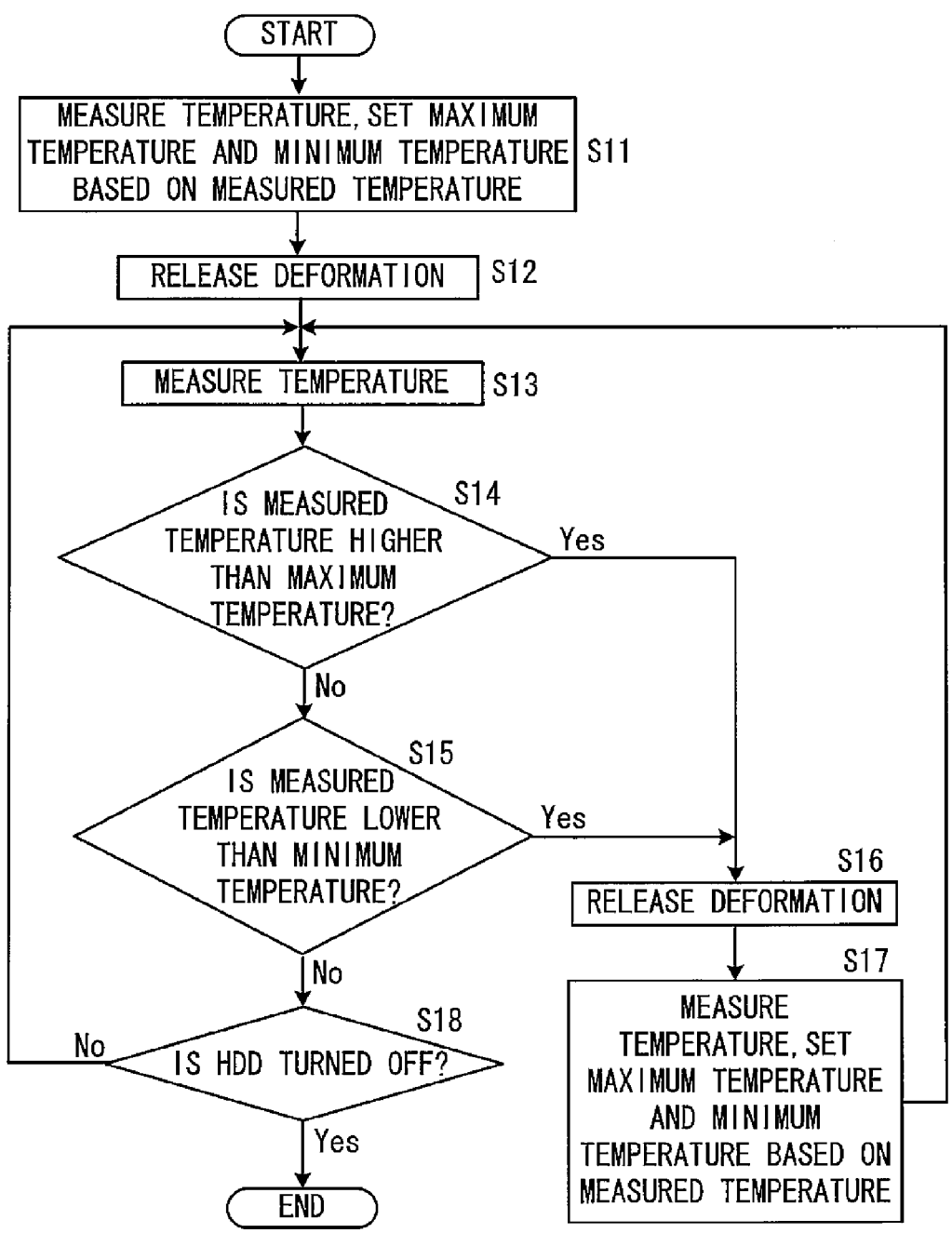
FIG. 3 is a flowchart of drive control for the carriage arm in accordance with temperature change.

FIG. 3 is a flowchart of the drive control for the carriage arm in accordance with temperature change.

When the HDD 10 is turned on and starts operating, the temperature sensor 7b in FIG. 1 measures the temperature inside the base 6. The information on the measured temperature is transmitted to the control substrate 8, and the control substrate 8 then sets a value obtained by adding a first predetermined value to the measured temperature, as the maximum temperature to be used in the following control. Further, the control substrate 8 sets a value obtained by subtracting a second predetermined value from the measured temperature, as the minimum temperature to be used in the following control (step S11). Subsequently, the control substrate 8 performs control for releasing deformation of the material of each section in the base 6 (step S12). In the following, control for releasing deformation is described in detail.

Figure 4:
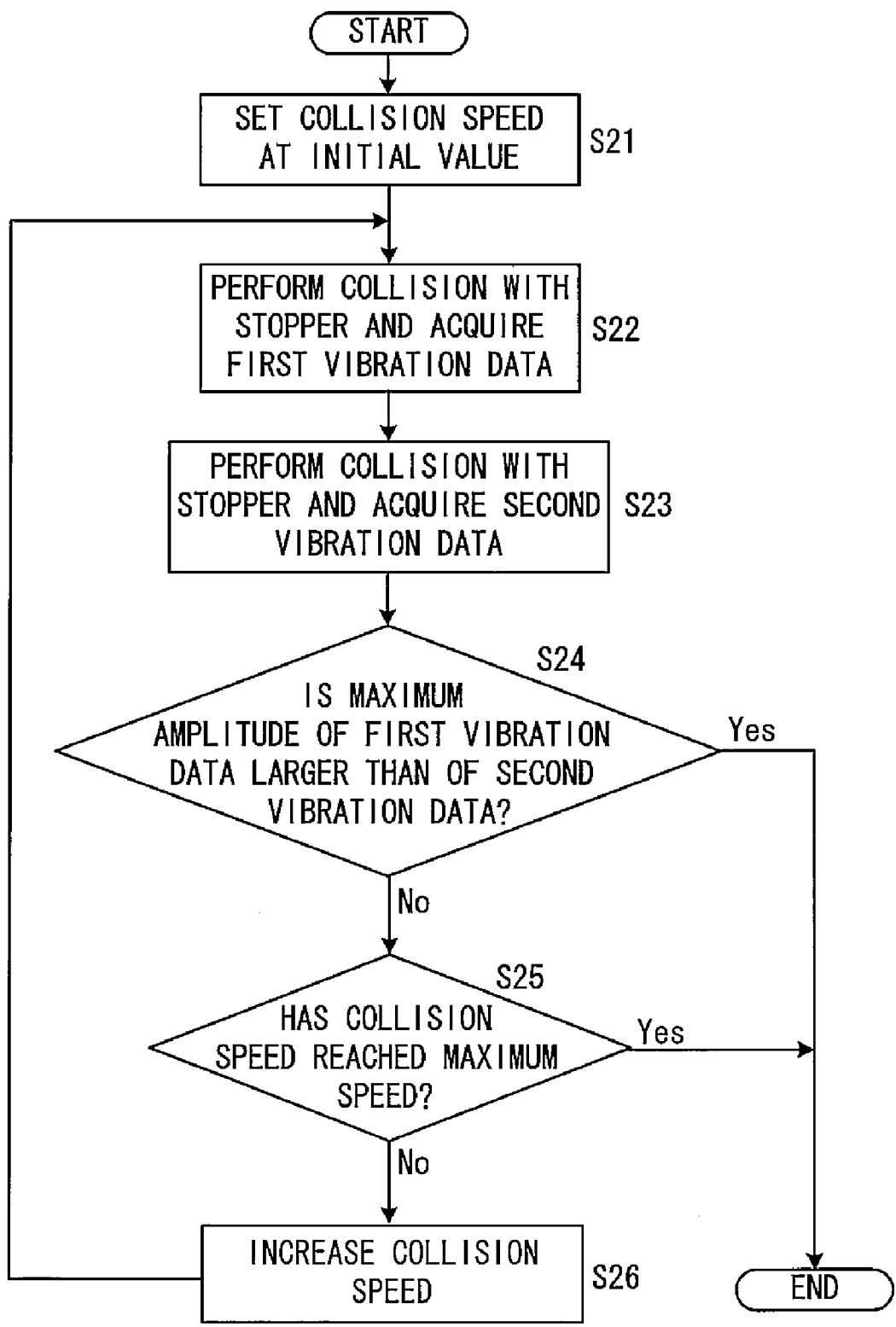
FIG. 4 is a flowchart of control for releasing deformation.

FIG. 4 is a flowchart of control for releasing deformation.

To release deformation, firstly, the control substrate 8 sets a collision speed at which the carriage arm 4 is to collide with the first stopper 50a, at an initial value (the lowest speed) stored in the control substrate 8 in advance (step S21 in FIG. 4). Then, the control substrate 8 controls the voice coil motor 5 to cause the carriage arm 4 to collide with the first stopper 50a at the collision speed of the initial value. At the time of this first collision with the first stopper 50a, the shock sensor 7a illustrated in FIG. 1 detects vibrations occurring in the base 6, and, on the basis of the detection result, the control substrate 8 generates vibration data representing the vibration state inside the base 6 (step S22 in FIG. 4). Thereafter, the control substrate 8 controls the voice coil motor 5 again to cause the carriage arm 4 to collide with the first stopper 50a at the collision speed of the initial value. Also at the time of this second collision with the first stopper 50a, the control substrate 8 generates vibration data representing the vibration state inside the base 6, on the basis of a detection result obtained by the shock sensor 7a (step S23 in FIG. 4).

Figure 5:
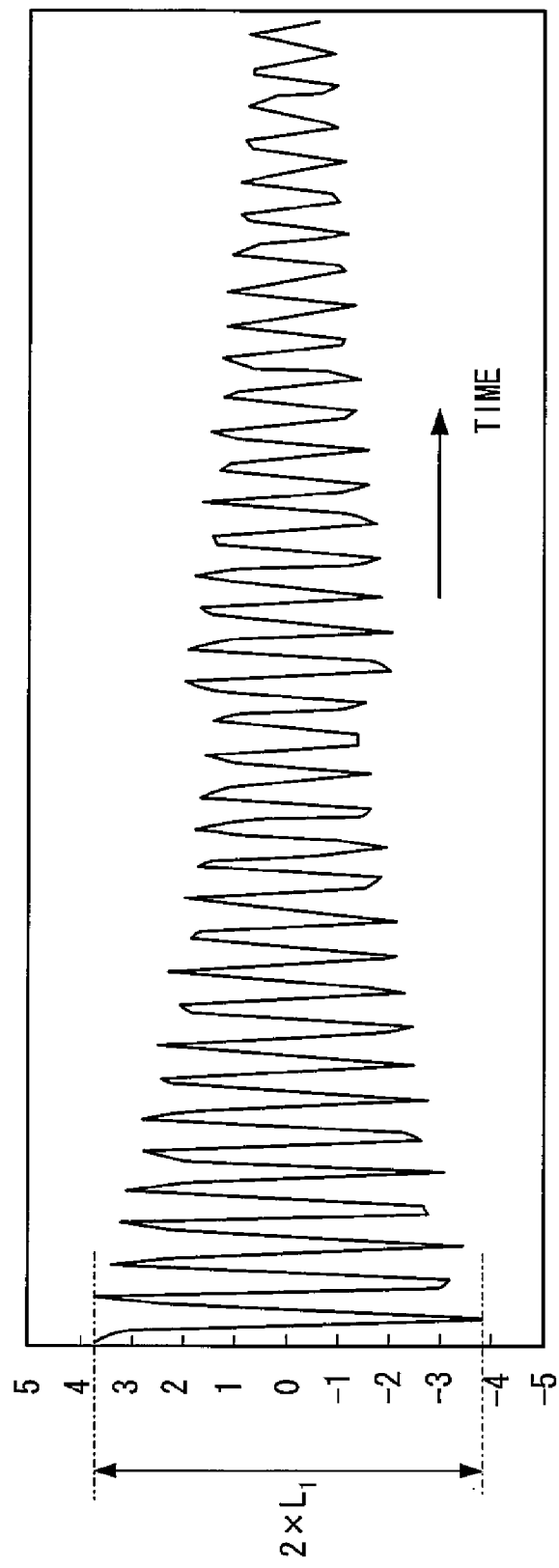
FIG. 5 is a graph representing an example of vibration data depicting a vibration state inside a base at the time of a first collision of the carriage arm with the first stopper.
Figure 6:
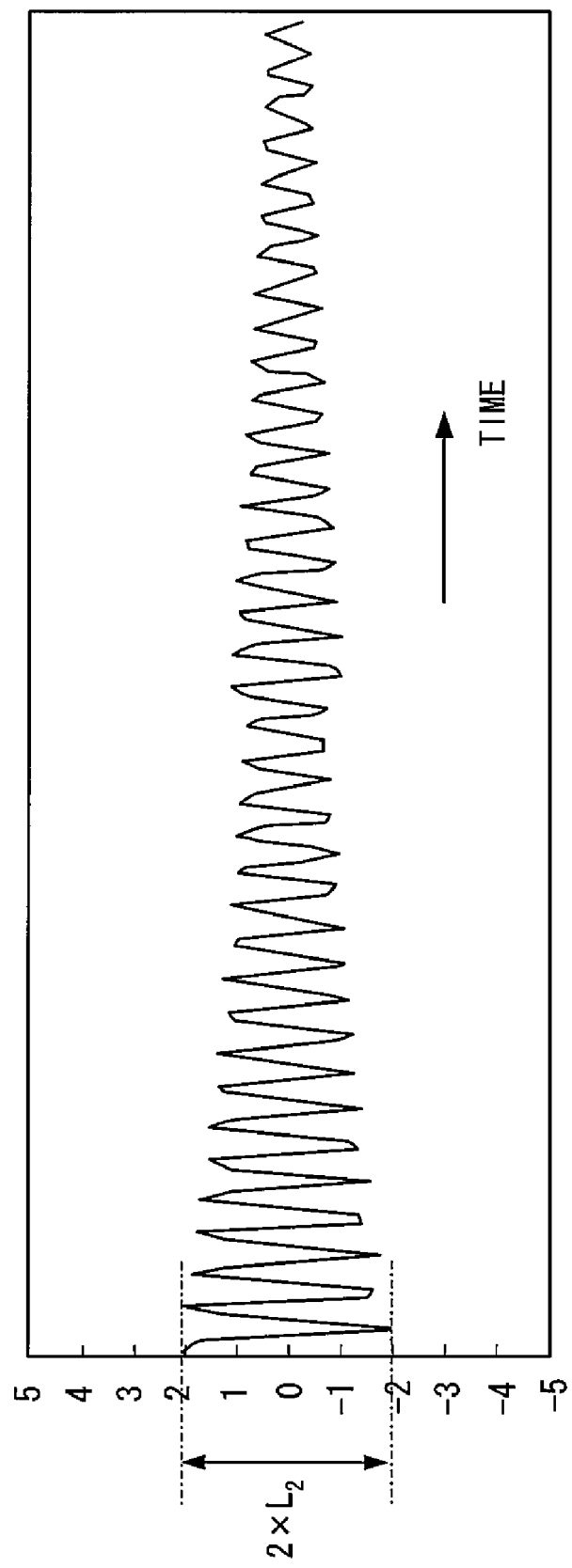
FIG. 6 is a graph representing an example of vibration data depicting a vibration state inside the base at the time of a second collision of the carriage arm with the first stopper.

FIG. 5 is a graph representing an example of vibration data depicting a vibration state inside the base 6 at the time of the first collision of the carriage arm 4 with the first stopper 50a; FIG. 6 is a graph representing an example of vibration data depicting a vibration state inside the base 6 at the time of the second collision of the carriage arm 4 with the first stopper 50a.

When deformation is sufficiently released by the first collision, the affect of the shock resulting from deformation release is small in the vibration data of the second collision. Accordingly, the amplitude of the vibration in the vibration data of the second collision as a whole is smaller than that in the vibration data of the first collision. FIG. 5 and FIG. 6 present the waveforms of vibration data representing such vibration states that deformation is sufficiently released by the first collision. Thus, the amplitude of the waveform of the second collision presented in FIG. 6 as a whole is smaller than that of the first collision presented in FIG. 5.

The control substrate 8 compares the maximum amplitude of the waveform of the first collision and the maximum amplitude of the waveform of the second collision (step S24 in FIG. 4). If the maximum amplitude of the waveform of the first collision is larger than that of the second collision (Yes in step S24), the control substrate 8 terminates the control for deformation release. For example, the maximum amplitude $L_1$ of the waveform of the first collision in FIG. 5 is larger than the maximum amplitude $L_2$ of the waveform of the second collision in FIG. 6; hence, in this case, the control for deformation release is terminated.

If the maximum amplitude of the waveform of the first collision is equal to or smaller than that of the second collision (No in step S24 in FIG. 4), the control substrate 8 checks whether the currently set collision speed of the carriage arm 4 has reached the maximum speed that is functionally permissible in the carriage arm 4 (step S25 in FIG. 4). If the collision speed of the carriage arm 4 is lower than the maximum speed (No in step S25 in FIG. 4), the control substrate 8 increases the collision speed of the carriage arm 4 by a predetermined amount (step S26 in FIG. 4), and then performs the process from step S22 to step S24. While the maximum amplitude of the waveform of the first collision is equal to or smaller than that of the second collision (No in step S24 in FIG. 4), the control substrate 8 repeats the process from step S22 to step S26 by increasing the collision speed of the carriage arm 4 by the predetermined amount until the collision speed of the carriage arm 4 reaches the maximum speed. When the maximum amplitude of the waveform of the first collision exceeds that of the second collision (Yes in step S24 in FIG. 4), the control substrate 8 terminates the control for deformation release.

If the collision speed of the carriage arm 4 reaches the maximum speed (Yes in step S25 in FIG. 4) before the maximum amplitude of the waveform of the first collision exceeds that of the second collision (No in step S24 in FIG. 4), the control substrate 8 terminates the control for deformation release. In this case, although some deformation may remain unreleased, collision of the carriage arm 4 at a speed above the maximum speed is not performed in this embodiment in order to avoid damaging the carriage arm 4.

The description is continued with reference to FIG. 3 again.

The above-described deformation release in step S12 is performed at the time when the HDD 10 is turned on. After the deformation release in step S12, the head 3 accesses the magnetic disc 2 in the HDD 10. Also during the access, the temperature sensor 7b measures the temperature (step 13), and the information on the measured temperature is transmitted to the control substrate 8.

When the measured temperature is equal to or lower than the maximum temperature (No in step S14) and equal to or higher than the minimum temperature (No in step S15), the access is performed while the temperature sensor 7b continues to measure the temperature until the HDD 10 is turned off. When the HDD 10 is turned off (Yes in step S18), the drive control for the carriage arm 4 in accordance with temperature change is terminated.

When the measured temperature is higher than the maximum temperature (Yes in step S14) or lower than the minimum temperature (No in step S14 and Yes in step S15), the access is suspended, and the deformation release is performed (step S16). Then, as in step S11, the temperature sensor 7b in FIG. 1 measures the temperature inside the base 6, and the control substrate 8 sets a maximum temperature at a value obtained by adding the first predetermined value to the measured temperature, while setting a minimum temperature at a value obtained by subtracting the second predetermined value from the measured temperature (step S17). The temperature sensor 7b measures the temperature again, and the checks in step S14 and step S15 are performed on the measured temperature by using the maximum temperature and the minimum temperature newly set in step S17. Since the maximum temperature and the minimum temperature are newly set, it is supposed in these checks that the measured temperature is determined to be equal to or lower than the new maximum temperature (No in step S14) and equal to or higher than the new minimum temperature (No in step S15). Consequently, the access is started again, and the temperature sensor 7b continues to measure the temperature (step S13) until the HDD 10 is turned off (Yes in step S18).

As described above, in the HDD 10 according to this embodiment, the temperature obtained by adding the first predetermined value to the measured temperature of the prior measurement is set as the maximum temperature while the temperature obtained by subtracting the second predetermined value from the measured temperature of the prior measurement is set as the minimum temperature. Thereby, comparisons are made between the measured temperature of the measurement of this time and the maximum temperature and between the measured temperature of the measurement of this time and the minimum temperature. As a result, it is determined whether or not the temperature change inside the base 6 is large. If the temperature change is determined to be large, the access by the head 3 is suspended, and the carriage arm 4 is caused to collide with the first stopper 50a. Thus, deformation release is encouraged in the materials used in the HDD 10. Accordingly, deformation release is less likely to occur during access by the head 3, and reduction in information reproduction accuracy and recording accuracy can be avoided. In addition, since only short time is needed for collision of the carriage arm 4 with the first stopper 50a, reduction in information reproduction operation efficiency and recording operation efficiency can also be avoided.

Moreover, in the HDD 10 according to this embodiment, the first stopper 50a is coupled with the yoke 52, which is particularly likely to be deformed attributable to temperature change since being coupled, at many parts, with other members. By causing the carriage arm 4 to collide with the first stopper 50a, deformation occurring in coupled parts of the yoke 52 can effectively be released.

The drive control for the carriage arm 4 in accordance with temperature change has been described above.

In the above description, collision of the carriage arm 4 with the first stopper 50 is performed twice respectively in step S22 and step S23 in FIG. 4 at the same speed, and the amplitudes of the waveforms of the respective collisions are compared. However, in the present invention, collision of the carriage arm 4 with the first stopper 50a may be performed three times or more at the same speed, and the amplitudes of the waveforms of the respective collisions may be compared.

Moreover, in the above description, in step S24 in FIG. 4, the maximum amplitudes of the waveforms of the first collision and the second collision are compared. However, in the present invention, comparison may be made between the average values of the absolute values of the amplitudes of the respective waveforms or may be made between the maximum values, or the average values, of the squares of the amplitudes of the respective waveforms. Alternatively, deformation release may be confirmed by checking whether the maximum amplitude of the waveform of the first collision, the average value of the absolute values of the amplitudes, or the like is above a predetermined level determined in accordance with the collision speed of the carriage arm 4, instead of comparing multiple waveforms resulting respectively from multiple collisions as described above.

On the basis of the above-described embodiment, preferable embodiments of the information storage apparatus are described below in contrast to the basic mode.

In the above-described basic mode, it is preferable that the information storage apparatus further includes a vibration detecting section that detects vibration generated in the housing resulting from collision of the head holding member with the rotation restricting member; and a deformation release judging section that judges whether deformation in the housing is released by the collision of the head holding member with the rotation restricting member, by analyzing the vibration detected by the vibration detecting section, wherein when the release judging section judges that the deformation is not released, the drive controlling section causes the driving section to drive the head holding member again to rotate until the head holding member collides with the rotation restricting member at a higher rotation speed than that in the previous collision.

With this embodiment, when deformation release is insufficient, collision of the head holding member and the rotation restricting member is performed at a higher collision speed than that of the prior collision, thereby more reliably avoiding deformation release from occurring during information reproduction or information recording by the head. In the embodiment, in step S24 in FIG. 4, when the maximum amplitude of the waveform of the first collision is determined to be equal to or smaller than that of the second collision (No in step S24), the collision speed is increased (step S26) until the collision speed reaches the maximum speed (No in step S25), and collisions in step S22 and step S23 are repeated. Thus, the preferable embodiment is implemented. In this preferable embodiment, a combination of the shock sensor 7a and the control substrate 8 is an example of the vibration detecting section, and the control substrate 8 is an example of the deformation release judging section.

Also in the above-described basic mode, it is preferable that the drive controlling section causes the driving section to drive the head holding member to collide with the rotation restricting member at a constant rotation speed a plurality of times, when the detection result by the temperature change detecting section indicates temperature change reaching the predetermined change range, and the deformation release judging section judges that the deformation is released when the magnitude of vibration caused by a certain one of the plurality of collisions performed at the constant rotation speed is larger than that caused by another collision performed after the certain collision.

With this embodiment, judgment on whether or not deformation release is sufficient can be readily made. In this embodiment, the maximum amplitudes of the waveforms of the first collision and the second collision are compared in step S24 in FIG. 4. Thus, the preferable embodiment is implemented.

Furthermore, in the above-described basic mode, it is preferable that the temperature change detecting section detects temperature change that occurs after deformation in the housing is released by a prior collision of the head holding member with the rotation restricting member.

With this embodiment, temperature change is detected on the basis of the temperature at the time of deformation release, so that the deformation accumulated after the deformation release can be accurately identified by the temperature change detection. In this embodiment, temperature change detection is performed in step S17 and step S13, after the deformation release is performed in step S16 in FIG. 3. Thus, the preferable embodiment is implemented.

In addition, in the above-described basic mode, it is preferable that the temperature change detecting section detects temperature change that occurs after deformation in the housing is released by a prior collision of the head holding member with the rotation restricting member, and the drive controlling section causes the driving section to drive the head holding member to collide with the rotation restricting member, when the detection result by the temperature change detecting section indicates any one of a temperature increase reaching a predetermined increase range and a temperature decrease reaching a predetermined decrease range.

With this embodiment, temperature increase or temperature decrease is detected on the basis of the temperature at the time of deformation release, so that the deformation accumulated after the deformation release can be accurately identified by the temperature increase/decrease detection. In this embodiment, temperature increase/decrease detection is performed in step S17 and step S13. Thus, the preferable embodiment is implemented.

As described above, the basic mode of the information storage apparatus embodies an information storage apparatus that is configured to avoid reduction in access accuracy attributable to deformation release.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although this embodiment(s) of the present invention(s) has (have) been described in detail, it should be understood that the various changes, substitutions, and alterations could be made hereto without departing from the spirit and scope of the invention.

What is claimed is:

1. An information storage apparatus comprising:
  a housing;
  a recording medium that is disposed in the housing and allows information to be recorded thereon;
  a head that performs at least one of information reproduction and information recording on the recording medium while being in contact with or being close to a surface of the recording medium;
  a head holding member that is disposed in the housing, holds the head, is rotatable about a predetermined axis, and moves the head along the recording medium by rotating about the axis;

a driving section that drives the head holding member to rotate about the axis;

a rotation restricting member that is disposed in a position where the head holding member collides with the rotation restricting member by rotating about the axis, and that restricts a rotation area of the head holding member;

a temperature change detecting section that detects temperature change in the housing; and a drive controlling section that causes the driving section to drive the head holding member to collide with the rotation restricting member, when a detection result by the temperature change detecting section indicates temperature change reaching a predetermined change range.

2. The information storage apparatus according to claim 1, further comprising:

a vibration detecting section that detects vibration generated in the housing resulting from collision of the head holding member with the rotation restricting member; and a deformation release judging section that judges whether deformation in the housing is released by the collision of the head holding member with the rotation restricting member, by analyzing the vibration detected by the vibration detecting section, wherein when the release judging section judges that the deformation is not released, the drive controlling section causes the driving section to drive the head holding member again to rotate until the head holding member collides with the rotation restricting member at a higher rotation speed than that in the previous collision.

3. The information storage apparatus according to claim 1, wherein the drive controlling section causes the driving section to drive the head holding member to collide with the rotation restricting member at a constant rotation speed a plurality of times, when the detection result by the temperature change detecting section indicates temperature change reaching the predetermined change range, and the deformation release judging section judges that the deformation is released when the magnitude of vibration caused by a certain one of the plurality of collisions performed at the constant rotation speed is larger than that caused by another collision performed after the certain collision.

4. The information storage apparatus according to claim 1, wherein the temperature change detecting section detects temperature change that occurs after deformation in the housing is released by a prior collision of the head holding member with the rotation restricting member.

5. The information storage apparatus according to claim 1, wherein the temperature change detecting section detects temperature change that occurs after deformation in the housing is released by a prior collision of the head holding member with the rotation restricting member, and the drive controlling section causes the driving section to drive the head holding member to collide with the rotation restricting member, when the detection result by the temperature change detecting section indicates any one of a temperature increase reaching a predetermined increase range and a temperature decrease reaching a predetermined decrease range.

* * * * *